United States Patent [19]

Fodor et al.

[11] 4,320,744
[45] Mar. 23, 1982

[54] SOLAR HEATED PORTABLE STRUCTURE

[76] Inventors: Eben V. Fodor, 3611 35th St., NW., Washington, D.C. 20016; John M. King; Folly F. King, both of 5225 Pooks Hill Rd., Bethesda, Md. 20014

[21] Appl. No.: 150,003

[22] Filed: May 15, 1980

[51] Int. Cl.³ .................................................. F24J 3/02
[52] U.S. Cl. ................... 126/450; 126/417; 126/426; 126/428; 128/372; 135/3 R
[58] Field of Search ............... 126/450, 417, 428, 429, 126/426; 47/17; 128/372; 135/3 R, 5 R

[56] References Cited

U.S. PATENT DOCUMENTS

| | | | |
|---|---|---|---|
| 407,434 | 7/1889 | Evans | 128/372 |
| 408,204 | 8/1889 | Babbitt | 128/372 |
| 1,669,484 | 5/1928 | Mowry | 128/372 |
| 1,772,219 | 8/1930 | Kempton | 128/372 |
| 1,946,567 | 2/1934 | Braunworth | 128/372 |
| 2,295,402 | 9/1942 | Hildebrand | 128/372 |
| 2,478,765 | 8/1949 | Kim | 128/372 |
| 2,493,328 | 1/1950 | Wandyak | 128/372 |
| 2,666,441 | 1/1954 | Powers | 135/14 R |
| 3,051,185 | 8/1962 | Reynolds | 135/3 R |
| 3,128,781 | 4/1964 | Kirkham | 128/372 |
| 3,165,110 | 1/1965 | Brooks | 135/3 R |
| 3,244,186 | 4/1966 | Thomason et al. | 126/439 |
| 3,271,786 | 9/1966 | Joy | 128/372 |
| 3,453,786 | 7/1969 | Rebarchek | 135/3 R |
| 3,483,871 | 12/1969 | Wilson | 128/372 |
| 3,670,750 | 6/1972 | Johnston | 128/372 X |
| 3,812,616 | 5/1974 | Koziol | 135/3 R |
| 4,011,874 | 3/1977 | Segawa et al. | 128/372 X |
| 4,031,674 | 6/1977 | Rand | 126/426 |
| 4,161,180 | 7/1979 | Tiger | 128/372 |
| 4,200,360 | 4/1980 | Mutzhas | 128/372 X |

FOREIGN PATENT DOCUMENTS

1362662  4/1964  France ......................... 128/293

*Primary Examiner*—Larry Jones
*Attorney, Agent, or Firm*—Roylance, Abrams, Berdo & Farley

[57] ABSTRACT

A solar heated portable structure comprising a flexible bottom panel, a flexible side assembly and a flexible transmitting panel, all coupled together and supported to form an enclosed chamber. The transmitting panel is capable of transmitting a majority of the radiant energy from the solar radiation spectrum to heat the enclosed chamber like a sauna and has an area at least 0.7 the area of the bottom panel to maximize heating while minimizing material costs. The transmitting panel can be transparent to ultraviolet radiation to allow persons inside the chamber to be tanned.

15 Claims, 10 Drawing Figures

SOLAR HEATED PORTABLE STRUCTURE

FIELD OF THE INVENTION

The present invention relates to a collapsible, portable structure formed by flexible walls having a solar radiation transmitting panel so the interior of the structure can be heated by solar radiation and act like a sauna. The transmitting panel can also be transparent to ultraviolet radiation so a person inside the structure can be tanned.

BACKGROUND OF THE INVENTION

Prior art structures are known which utilize the sun's rays to act as a steam bath or sauna. Other structures are also known in which people can obtain a suntan in the winter.

However, none of these prior art structures are practical since they are heavy and formed from rigid material and are therefore not collapsible or portable. Moreover, many of these prior art structures do not efficiently utilize the rays of the sun, and are very expensive to manufacture.

Examples of such prior art structures and related structures are disclosed in the following U.S. Pat. Nos.: 407,434 to Evans; 408,204 to Babbitt; 1,669,484 to Mowry; 1,772,219 to Kempton; 1,946,567 to Braunworth; 2,478,765 to Kim; 2,493,328 to Wandyak; 2,666,441 to Powers; 3,051,185 to Reynolds; 3,128,781 to Kirkham; 3,165,110 to Brooks; 3,271,786 to Joy; 3,453,786 to Rebarchek; 2,483,871 to Wilson; 3,812,616 to Koziol; 4,031,674 to Rand; and 4,161,180 to Tiger.

SUMMARY OF THE INVENTION

Accordingly, a primary object of the present invention is to provide a solar heated portable and collapsible structure which is inexpensive to manufacture and efficiently utilizes the sun's radiation to provide heat and therefore a sauna effect inside the structure.

Another object of the present invention is to provide such a structure which can be utilized in the winter for obtaining a suntan.

Another object of the present invention is to provide such a structure which has flexible walls so that it is capable of being easily collapsed and transported to any desired location.

Another object of the present invention is to provide such a structure which maximizes the heating effect from the sun's radiation while minimizing material costs.

The foregoing objects are basically attained by providing a solar heated portable structure comprising a flexible bottom panel; a flexible side assembly coupled to the bottom panel; a flexible transmitting panel coupled to the bottom panel and side assembly; a support frame coupled to the transmitting panel to support the transmitting panel above the bottom panel; the bottom panel, side assembly and transmitting panel forming an enclosed chamber; the transmitting panel being capable of transmitting a majority of the radiant energy from the solar radiation spectrum to heat the enclosed chamber and act like a sauna; the area of the transmitting panel being at least 0.7 the area of the bottom panel; and means for venting the enclosed chamber to the atmosphere and for providing ingress and egress to the enclosed chamber, whereby persons in the enclosed chamber can enjoy the heated space defined thereby.

Advantageously, this structure, which is essentially tent-like, has a transmitting panel which is also transparent to ultraviolet radiation from the solar radiation spectrum so that the persons inside can receive a suntan.

The transmitting panel can be visibly transparent or translucent, and so can the side assembly. Preferably, the bottom panel is dark in color to absorb solar radiation.

Advantageously, the combined bottom panel, side assembly and transmitting panel form the enclosed chamber so that wind cannot easily penetrate the interior, thereby making the structure suitable for sunbathing in the winter time.

Other objects, advantages and salient features of the present invention will become apparent from the following detailed description which, taken in conjunction with the annexed drawings, discloses preferred embodiments of the present invention.

DRAWINGS

Figure 9:
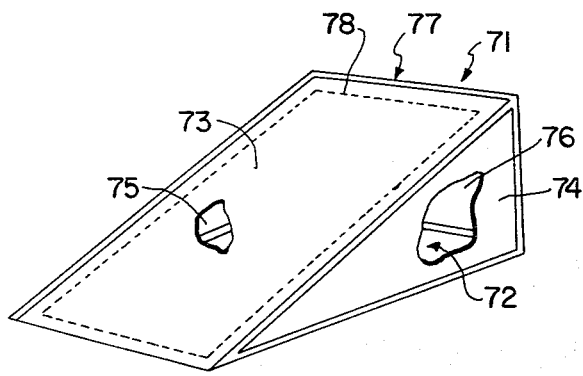
Figure 10:
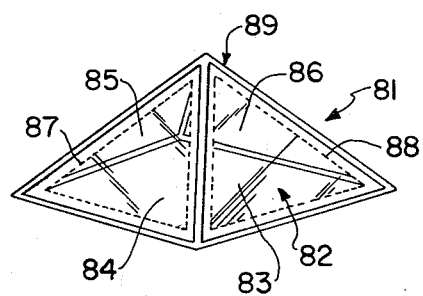

FIG. 9 is a perspective view of another alternative embodiment of the present invention in which the bottom panel is rectangular, the transmitting panel is rectangular and the side assembly is comprised of two triangular faces and a rectangular face, the transmitting panel not being visibly transparent but instead translucent; and FIG. 10 is a perspective view of another alternative embodiment of the present invention in which the bottom panel is rectangular and the transmitting panel comprises two faces of a pyramid extending upwardly from the bottom panel, the side assembly comprising the two remaining faces, the transmitting panel being visibly transparent.

DETAILED DESCRIPTION OF THE INVENTION

Referring now to FIGS. 1–6, the solar heated portable structure 10 in accordance with the present invention comprises a bottom panel 12, a side assembly 14 and a transmitting panel 16 supported above the bottom panel by means of a support frame 18.

Figure 3:
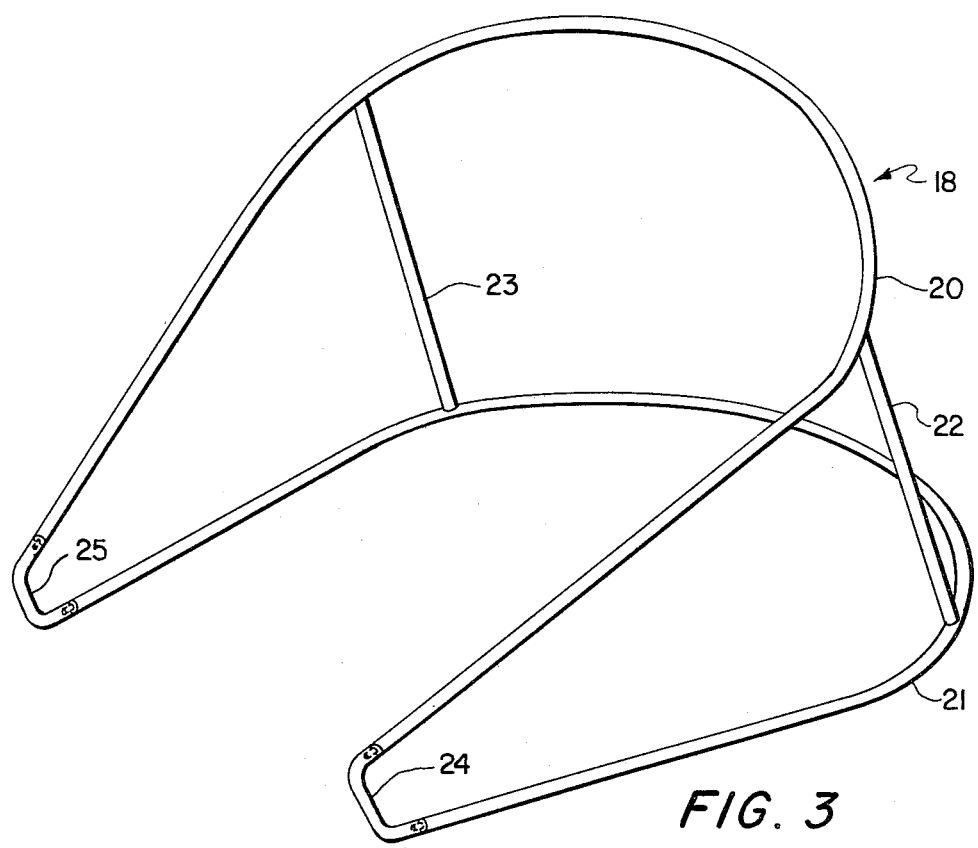
FIG. 3 is a perspective view of the support frame supporting the structure shown in FIG. 1.
Figure 4:
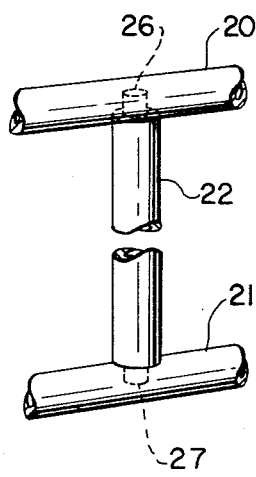
FIG. 4 is a fragmentary elevational view of a portion of the support frame shown in FIG. 3.

As seen in FIGS. 3 and 4, the support frame 18 is comprised of a first substantially U-shaped support member 20, a second substantially U-shaped support member 21, two substantially upright supports 22 and 23 interconnecting the first and second members 20 and 21 and supporting the first member above the second member, and two substantially U-shaped end supports 24 and 25. End support 24 interconnects adjacent ends of the first and second support members 20 and 21 and the other end support 25 interconnects the other ends of these support members. Advantageously, the various elements forming the support frame 18 are plastic or aluminum rods or tubes which are light in weight and can be bent to the proper configuration as seen in FIG. 3. The first and second support members 20 and 21 can advantageously be formed from a plurality of short tubes coupled together by an elastic band extending through the interior thereof with one end of each of the short tubes being reduced in diameter and received in the adjacent end of another tube.

As seen in FIG. 4, the upright support 22 can have two reduced ends 26 and 27 and can be suitably received in suitable bores in the first and second support members 20 and 21. A similar connection can be made between upright support 23 and the first and second support members 20 and 21.

Figure 5:
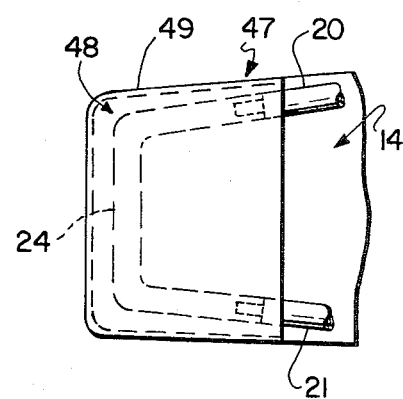
FIG. 5 is a fragmentary side elevational view of a pocket formed in the structure of FIG. 1 and receiving a portion of the support frame.

A similar type of connection is also shown in FIG. 5 with the first support member 20 and the second support member 21 having reduced ends receivable in suitable bores in the ends of the U-shaped end support 24.

Referring again to FIGS. 1-2, the bottom panel 12 is formed of a flexible sheet of material such as waterproof nylon and in plan view has a substantially U-shaped outer configuration. It is preferably opaque to solar radiation in the visible part of the spectrum and also preferably dark so as to absorb solar radiation.

Figure 1:
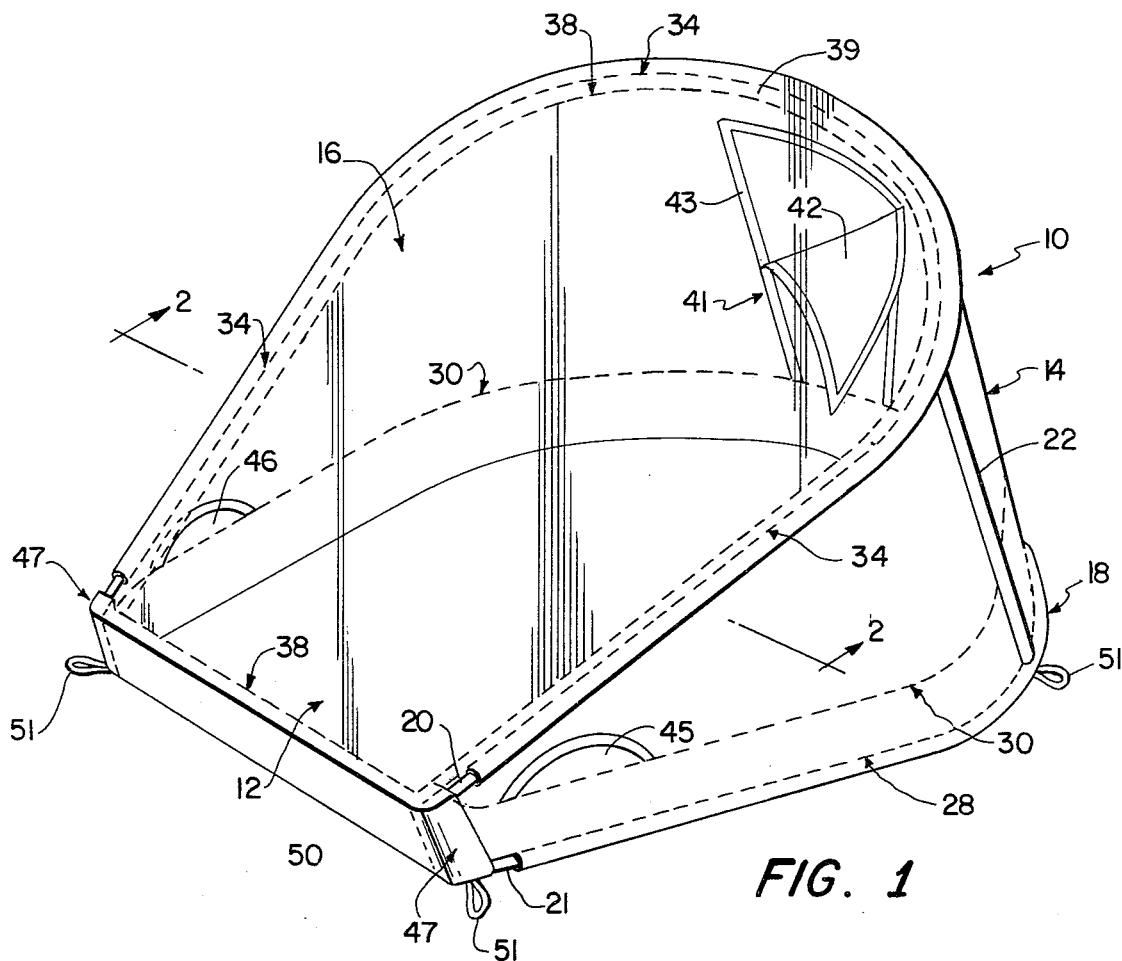
FIG. 1 is a perspective view of the structure in accordance with the present invention with a visibly transparent transmitting panel making various of the interior parts of the structure visible from the view shown therein, the dotted lines indicating stitching of the various flexible materials forming the structure.
Figure 2:
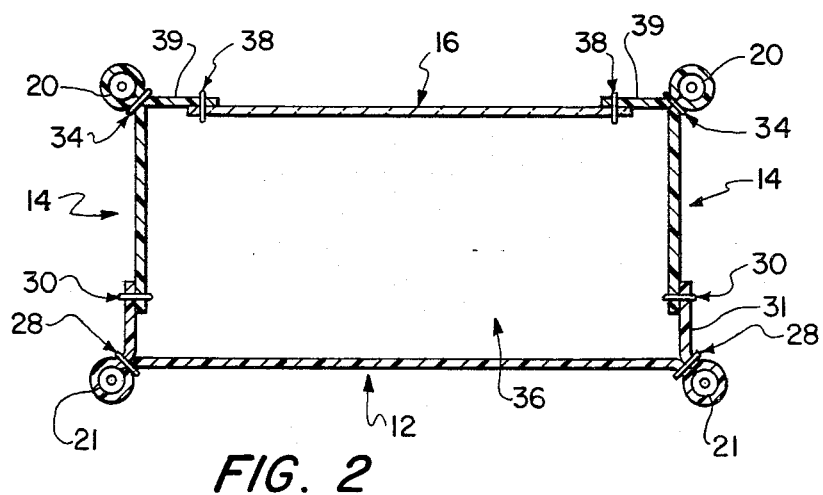
FIG. 2 is a sectional view taken along lines 2—2 in FIG. 1.

The bottom panel 12 is supported by the second support member 21 by having a portion of the bottom panel 12 received around the support member 21 and stitched by stitching 28, seen in FIGS. 1 and 2.

The side assembly 14 is comprised of an integral piece of flexible sheet material such as breathable nylon and can be opaque, translucent or transparent to solar radiation in the visible part of the spectrum. It can also have a reflective inner surface or can be transparent to ultraviolet radiation. The lower part of the side assembly 14 is stitched above member 21 by means of stitching 30 to a peripheral edge 31 of the material forming the bottom panel 12 and extends upwardly where it is received about the first support member 20 and coupled thereto by means of stitching 34 which fastens the first support 20 inside and to the side assembly 14.

As seen in FIGS. 1 and 2, the transmitting panel 16 is in the form of a flexible sheet of material such as Mylar, polyethylene, or Teflon FEP and can be capable of transmitting a majority of the radiant energy from the solar radiation spectrum to heat the enclosed chamber 36 formed by the combined transmitting panel, side assembly and bottom panel. Advantageously, the transmitting panel can be transparent or translucent with regard to radiation in the visible part of the spectrum and can be transparent to ultraviolet radiation so that persons inside the enclosed chamber can receive a suntan. In plan view the transmitting panel has a substantially U-shaped outer configuration.

The area of the transmitting panel is at least 0.7 the area of the bottom panel to maximize the heating effects inside the chamber while minimizing the costs of the transmitting panel material as well as the material forming the remaining part of the structure.

As best seen in FIG. 2, the transmitting panel 16 is stitched by stitching 38 to a peripheral portion 39 of the material forming the side assembly and extending from the first support member 20.

As seen in FIG. 1, a door 41 is formed in the side assembly 14 by cutting the material to define a flap 42 which is free on three sides and can be releasably coupled to the side assembly 14 on these three sides by means of a conventional zipper or Velcro fastener, indicated at 43. This door 41 allows ingress and egress from the enclosed chamber 36 and can also provide a venting to the atmosphere of the enclosed chamber if left partly open as seen in FIG. 1.

In addition, two venting flaps 45 and 46 can be formed in the side assembly 14 adjacent the front of the structure in a fashion similar to that of the door 41, these venting flaps being capable of adjustment so as to be fully or partially open, thereby controlling the ventilation of the enclosed chamber 36.

Figure 6:
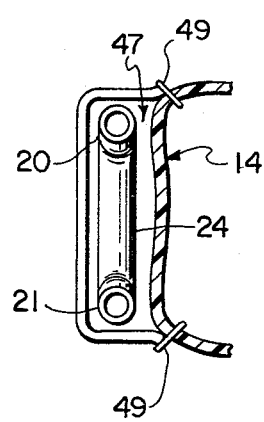
FIG. 6 is an end view of the elements shown in FIG. 5.

As seen in FIGS. 1, 5 and 6, the end supports 24 and 25 of the support frame 18 are received in pockets 47 formed by a sheet of material 48 stitched to the opposite sides of the side assembly 14 by means of stitching 49.

As seen in FIG. 1, a portion 50 of the bottom panel 12 extends between the pockets 47 at the front of the structure 10 and is stitched by stitching 38 to the transmitting panel 16.

Loops 51 are stitched to the bottom panel so the entire structure can be staked to the ground.

EMBODIMENT OF FIG. 7

Figure 7:
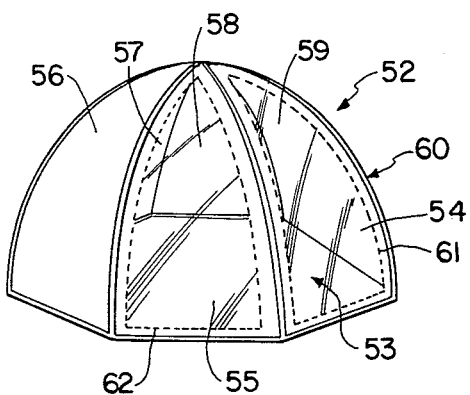
FIG. 7 is a perspective view of an alternative embodiment of the present invention with visibly transparent transmitting panels coupled to a hexagonal bottom panel, the transmitting panels comprising two faces extending from the bottom panel and the side assembly forming the remaining four faces.

As seen in FIG. 7, an alternative embodiment of the present invention comprises a structure 52 having a bottom panel 53 substantially in the form of a hexagon with the transmitting panel comprising at least two faces 54 and 55 extending upwardly from at least two of the sides of the hexagonal bottom panel. The side assembly comprises the remaining four faces 56–59 extending upwardly from the remaining sides of the hexagonal bottom panel, all six faces tapering to a common point at the top of the structure. A suitable support frame 60, formed like the support frame 18 discussed above, is suitably coupled to the various faces to support the faces 54–59 above the bottom panel 53. A suitable door and suitable venting flaps can also be provided similar to those discussed above.

As seen in FIG. 7, the transmitting panel faces 54 and 55 are transparent in the visible part of the radiation spectrum so that the interior of the structure 52 can be seen through these faces. The area of these faces 54 and 55 is at least 0.7 the area of the bottom panel 53. These transmitting panel faces 54 and 55 are stitched by means of stitching 61 and 62 to the remaining parts of the structure formed from flexible material, similar to that described above regarding the embodiment of FIGS. 1–6.

EMBODIMENT OF FIG. 8

Figure 8:
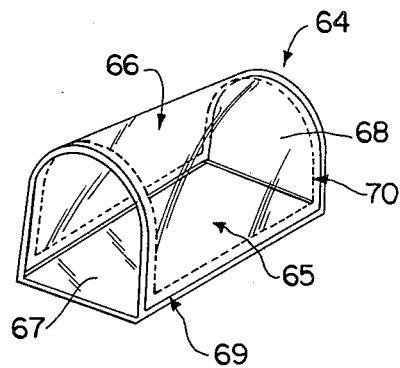
FIG. 8 is a perspective view of another alternative embodiment of the present invention in which the bottom panel is rectangular and the transmitting panel is substantially semi-cylindrical, this transmitting panel and the two side panels being visibly transparent.

Another alternative embodiment of the present invention is shown in FIG. 8 where the structure 64 has a substantially rectangular bottom panel 65, a transmitting panel 66 comprising a substantially semi-cylindrical face extending from two of the sides of the rectangular bottom panel and attached by stitching 70, and a side assembly comprising two substantially semi-circular faces 67 and 68 extending from the remaining two sides of the rectangular bottom panel and being coupled to the transmitting panel 66 by stitching 70. A suitable support frame 69, similar to the support frame 18 discussed above, is utilized to support the transmitting panel 66 above the bottom panel 65. The transmitting panel 66 has an area at least 0.7 the area of the bottom panel 65.

As seen in FIG. 8, the transmitting panel 66 and the two side assembly faces 67 and 68 are transparent to solar radiation in the visible part of the spectrum. A suitable door and suitable venting flaps can also be provided similar to those discussed above.

EMBODIMENT OF FIG. 9

The structure 71 seen in FIG. 9 is another alternative embodiment of the present invention in which the bottom panel 72 is substantially in the form of a rectangle, the transmitting panel 73 is substantially in the form of a rectangle, and the side assembly comprises two substantially triangular faces 74 and 75 and a rear rectangular face 76. This structure is suitably supported at the edges of the various faces and panels by a support frame 77 and the transmitting panel 73 is coupled to the other parts of the structure by means of stitching 78.

As seen in FIG. 9, the transmitting panel 73, as well as the remaining faces, are all not transparent but instead translucent to solar radiation in the visible part of the spectrum. A suitable door and suitable ventilating flaps can be formed in structure 71 similar to those described above with regard to the embodiment of FIGS. 1-6. The area of the transmitting panel 73 is at least 0.7 the area of the bottom panel 72. As set forth above regarding FIGS. 1-6, the transmitting panel and the faces can be transparent to solar radiation in the visible part of the spectrum if desired.

EMBODIMENT OF FIG. 10

A structure 81 is shown in FIG. 10 which is a further alternative embodiment of the present invention, the structure comprising a substantially rectangular bottom panel 82 in which the transmitting panel and the side assembly are in the form of a pyramid, the transmitting panel comprising at least two of the faces 83 and 84 of the four-sided pyramid and the side assembly comprising the remaining two faces 85 and 86. The faces 83 and 84 forming the transmitting panel are transparent to solar radiation in the visible part of the spectrum and are stitched by stitching 87 and 88 to various other suitable parts of the structure formed from flexible material. A suitable support frame 89, similar to support frame 18 discussed above, supports the transmitting panel formed of faces 83 and 84 above the bottom panel 82. The combined areas of the two faces 83 and 84 are at least 0.7 the area of the bottom panel 82. A suitable door and suitable venting flaps can be provided in structure 81 similar to that discussed above regarding structure 10.

A working model of the invention, as seen in FIGS. 1-6, has been built and tested at approximately 38.5° north latitude in Washington, D.C. Two tests were run, the first in February and the second in March.

The first test took place at 12:30 p.m. on a day with a sunny and clear sky and a temperature of 24° F. After approximately five minutes of exposure to solar radiation, the enclosed chamber of the invention reached a temperature of 112° F.

The second test took place at 1:00 p.m. on a day with a partly sunny sky with scattered clouds and haze and a temperature of 40° F. After approximately five minutes of exposure to solar radiation, the enclosed chamber of the invention reached a temperature of 130° F.

The working model, used in both tests, had a transmitting panel area of about 30 square feet and a bottom wall area of about 30 square feet. The transmitting panel and the bottom wall each had a longitudinal dimension of about 81 inches, a transverse width at the widest extent of about 68 inches and a transverse width at the narrowest extent between end supports 24 and 25 of about 51 inches. The height of the structure, at its highest point, was 48 inches.

While various advantageous embodiments have been chosen to illustrate the invention, it will be understood by those skilled in the art that various changes and modifications can be made therein without departing from the scope of the invention as defined in the appended claims.

What is claimed is:

1. A solar heated collapsible and portable structure comprising:
    a flexible bottom panel that is dark in color to absorb radiant energy;
    a flexible side assembly coupled to said bottom panel;
    a flexible transmitting panel coupled to said bottom panel and side assembly;
    a support frame coupled to said transmitting panel to support said transmitting panel above and over said bottom panel,
    said bottom panel, side assembly and transmitting panel forming an enclosed chamber so that wind cannot easily penetrate the interior defined thereby,
    said transmitting panel being capable of transmitting a majority of the radiant energy from the solar radiation spectrum to heat said enclosed chamber and act like a sauna,
    the area of said transmitting panel being at least 0.7 the area of said bottom panel; and
    means for selectively venting said enclosed chamber to the atmosphere and for providing ingress and egress to said enclosed chamber,
    whereby persons in said enclosed chamber can enjoy the heated space defined thereby.

2. A structure according to claim 1, wherein said transmitting panel is formed of material that transmits a majority of the radiant energy in the visible part of the solar radiation spectrum and is therefore visibly transparent.

3. A structure according to claim 1, wherein said transmitting panel is formed of material that transmits only a part of the radiant energy in the visible part of the solar radiation spectrum and is therefore visibly translucent.

4. A structure according to claim 1, wherein said transmitting panel is formed of material that transmits radiant energy in the ultraviolet part of the solar radiation spectrum, thereby allowing persons in said enclosed chamber to be tanned.

5. A structure according to claim 1, wherein said side assembly has a reflective surface on the inside thereof to reflect the radiant energy.

6. A structure according to claim 1, wherein said side assembly is formed of a material that transmits a majority of the radiant energy in the visible part of the solar radiation spectrum and is therefore visibly transparent.

7. A structure according to claim 1, wherein said side assembly is formed of material that transmits radiant energy in the ultraviolet part of the solar radiation spectrum.

8. A structure according to claim 1, wherein said bottom panel is substantially U-shaped in plan view, and
said transmitting panel is substantially U-shaped in plan view.

9. A structure according to claim 8, wherein said support frame comprises a substantially U-shaped first support member coupled to said bottom panel, and a substantially U-shaped second support member coupled to said transmitting panel.

10. A structure according to claim 9, wherein said support frame further comprises means for interconnecting said first and second support members.

11. A structure according to claim 1, wherein said bottom panel is substantially in the form of a hexagon,
said transmitting panel comprises at least two faces extending from at least two of the sides of said hexagonal bottom panel, and
said side assembly comprises the remaining faces extending from the sides of said hexagonal bottom panel.

12. A structure according to claim 1, wherein said bottom panel is substantially in the form of a rectangle,
said transmitting panel comprises a semi-cylindrical face extending from two of the sides of said rectangular bottom panel, and
said side assembly comprises two substantially semicircular faces extending from the remaining two sides of said rectangular bottom panel.

13. A structure according to claim 1, wherein said bottom panel is substantially in the form of a rectangle,
said transmitting panel is substantially in the form of a rectangle, and
said side assembly comprises two substantially triangular faces.

14. A structure according to claim 1, wherein said bottom panel is substantially in the form of a rectangle,
said transmitting panel and said side assembly are in the form of a pyramid, said transmitting panel comprising at least two of the faces of such pyramid.

15. A solar heated collapsible and portable structure comprising:
a flexible, generally planar bottom panel that is dark in color to absorb radiant energy;
a flexible side assembly coupled to said bottom panel;
a flexible, generally planar transmitting panel coupled to said bottom panel and side assembly;
a support frame coupled to said transmitting panel to support said transmitting panel above and over and at an acute angle to said bottom panel,
said bottom panel, side assembly and transmitting panel forming an enclosed chamber so that wind cannot easily penetrate the interior defined thereby,
said transmitting panel being capable of transmitting a majority of the radiant energy from the solar radiation spectrum to heat said enclosed chamber and act like a sauna,
the area of said transmitting panel being at least 0.7 the area of said bottom panel; and
means for selectively venting said enclosed chamber to the atmosphere and for providing ingress and egress to said enclosed chamber,
whereby persons in said enclosed chamber can enjoy the heated space defined thereby.

* * * * *